US012119175B2

(12) United States Patent
Kuiper et al.

(10) Patent No.: US 12,119,175 B2
(45) Date of Patent: Oct. 15, 2024

(54) ELECTROMAGNETICALLY CONTROLLED SEGMENTED MIRROR, ELECTROMAGNETIC ACTUATOR FOR USE THEREIN AND METHOD FOR MANUFACTURING THE SAME

(71) Applicant: Nederlandse Organisatie voor toegepast-natuurwetenschappelijk onderzoek TNO, 's-Gravenhage (NL)

(72) Inventors: Stefan Kuiper, Zwolle (NL); Thomas Paulus Cornelis Van Adrichem, Eindhoven (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 44 days.

(21) Appl. No.: 17/927,116

(22) PCT Filed: May 27, 2021

(86) PCT No.: PCT/NL2021/050336
§ 371 (c)(1),
(2) Date: Nov. 22, 2022

(87) PCT Pub. No.: WO2021/242101
PCT Pub. Date: Dec. 2, 2021

(65) Prior Publication Data

US 2023/0207174 A1 Jun. 29, 2023

(30) Foreign Application Priority Data

May 28, 2020 (EP) .................................... 20177104

(51) Int. Cl.
*H01F 7/16* (2006.01)
*H01F 7/08* (2006.01)

(52) U.S. Cl.
CPC ............... *H01F 7/081* (2013.01); *H01F 7/16* (2013.01)

(58) Field of Classification Search
CPC ............... H01F 7/081; H01F 7/16; H01F 7/06
(Continued)

(56) References Cited

U.S. PATENT DOCUMENTS 7,149,427 B1 12/2006 Dewa et al.
2018/0210008 A1 * 7/2018 Kuiper .................. G01Q 20/00
(Continued)

FOREIGN PATENT DOCUMENTS

EP 2009501 A2 12/2008
JP 2007073580 A 3/2007
(Continued)

OTHER PUBLICATIONS

European Patent Office, International Search Report in corresponding International Application No. PCT/NL2021/050336, dated Aug. 12, 2021 (3 pages).

*Primary Examiner* — Shawki S Ismail
*Assistant Examiner* — Lisa N Homza
(74) *Attorney, Agent, or Firm* — Leydig, Voit & Mayer, Ltd.

(57) ABSTRACT

An electromagnetic actuator including a soft-ferromagnetic yoke is described. The electromagnetic actuator includes an at least substantially cylindrical circumferential wall covered at a first end with a base and at a second end with a top, the circumferential wall defining an axis in a direction from the base end to the top. An intermediate yoke section holds a permanent magnet fixed that leaves an inner space housing an axially movable core element being flexibly restrained with at least one resilient element. One of a base yoke section and/or a top yoke section houses an electromagnetic coil.

19 Claims, 8 Drawing Sheets

10 = {10a, 10b, 10c}

(58) Field of Classification Search
USPC .......................................................... 335/255
See application file for complete search history.

(56) References Cited

U.S. PATENT DOCUMENTS

| | | | | |
|---|---|---|---|---|
| 2020/0218059 A1* | 7/2020 | Kuiper | ................ | G02B 26/085 |
| 2021/0116700 A1* | 4/2021 | Kuiper | ................ | G02B 26/085 |

FOREIGN PATENT DOCUMENTS

| | | | |
|---|---|---|---|
| WO | 2007/008068 | A1 | 1/2007 |
| WO | 2018/145704 | A1 | 8/2018 |

* cited by examiner

ELECTROMAGNETICALLY CONTROLLED SEGMENTED MIRROR, ELECTROMAGNETIC ACTUATOR FOR USE THEREIN AND METHOD FOR MANUFACTURING THE SAME

CROSS-REFERENCE TO RELATED APPLICATIONS

This patent application is a U.S. National Phase of PCT International Application No. PCT/NL2021/050336, filed May 27, 2021, which claims priority to European Application No. 20177104.5, filed May 28, 2020, which are both expressly incorporated by reference in their entireties, including any references contained therein.

BACKGROUND

The present disclosure pertains to an electromagnetically controlled segmented mirror.

The present disclosure further pertains to an electromagnetic actuator for use therein.

The present disclosure still further pertains to a method for manufacturing an electromagnetic actuator.

Electromagnetically controlled segmented mirrors comprise a plurality of mirror segments that can be individually deformed by a respective electromagnetic actuator. Such deformable mirrors are used, for example, in astronomy or in laser communication to compensate for wave-front disturbances. Dependent on the application, such a deformable mirror typically has a hundred to thousands of actuators.

A circular symmetric actuator design is known from WO 2007/008068. The actuator disclosed therein comprises a leaf spring attached to a carrier in at least one point of attachment, means for providing a magnetic field and means for guiding the magnetic field so as to provide a magnetic flux loop. A movable part of the leaf spring is movable relative to the means for providing the magnetic field. The actuator further comprises a drive core attached to the movable part of the leaf spring, which is incorporated in the flux loop, for imparting the relative movement to the movable part. The drive core is so positioned that the magnetic properties of the flux loop are changed under the influence of said relative movement for gearing the magnetic force on the drive core and the spring force of the leaf spring to each other. This configuration has the advantage that it consists of a layered structure of elements, which makes it easy to manufacture. It is a disadvantage of the known device however that its efficiency is relatively low.

SUMMARY

It is an object of the present disclosure to provide an improved electromagnetic actuator that like the known electromagnetic actuator can be easily assembled, but that has a higher efficiency.

This object is achieved with an electromagnetic actuator as specified in claim 1.

This configuration, that can be efficiently assembled, provides for a substantially linear response.

In some embodiments, the at least one resilient element is a first membrane arranged between the intermediate yoke section and one of the base yoke section and the top yoke section.

In some embodiments, the intermediate yoke section is integral with the base yoke section or with the top yoke section.

In some embodiments, the actuator is assembled from the base yoke section, the intermediate yoke section and the top yoke section as mutually distinct components. In some examples thereof, the base yoke section is assembled from a first and a second component, the first component comprising the base and said base protrusion and the second component being the first axial section of the circumferential wall. In further examples thereof, the top yoke section is assembled from a first and a second component, the first component comprising the top and the top protrusion and the second component being the third axial section of the circumferential wall. In some other examples both the top and the base are provided in this way as an assembly of components.

In some embodiments, the at least one resilient element is a first membrane arranged between the base yoke section and the intermediate yoke section. Furthermore in these embodiments the actuator comprises a second membrane arranged between the intermediate yoke section and the top yoke section as a further resilient element.

In some embodiments the first membrane comprises a central portion fixed to the axially movable core element and a first, a second and a third suspension arm radially extending outwards to an end where it is mechanically coupled between a pair of yoke sections. The second membrane can have similar construction. The membranes can be readily assembled with the other components. In examples thereof, the end of the suspension arms bifurcates into a first and a second end portions that at least partly extend radially inward. Therewith the effective length of the suspension arms is increased, allowing for more flexibility. The end portions may further extend in mutually opposite tangential directions where they are fixed with a connection element. The connection element can be fixed for example being claimed between subsequent yoke sections, or be adhered thereto. In some embodiments a space is provided around the ends of the suspension arms, so that their movement is only restrained by the connection elements.

The present disclosure further provides an actuator array that comprises a plurality of spatially distributed actuators. In embodiments thereof the actuators comprise at least one part that is integrally formed. In an example of these embodiments the at least one part is a section of the yoke, wherein for each of said electromagnetic actuators said section of the yoke is formed in a single patterned block of soft-ferromagnetic material. In another example thereof, the at least one part is a membrane the membranes of the actuators being formed as a single patterned plate of a resilient, non-magnetic material. By providing parts of the individual actuators as a single block or plate, assembly of the actuator array can be more efficient.

The present disclosure further provides a mirror that comprises a plurality of mirror segments which are movable relative to each other, respective mirror segments being mechanically coupled to an actuation rod of a respective actuator of an actuator array. As a first example a relatively small mirror may be provided having an actuator array with a few hundreds of actuators with a lateral size in the order of a few mm for a mirror with a diameter of a few cm to a few tens of cm e.g. 10 or 20 cm. For such relatively small mirrors requiring closely packed actuators it is particularly advantageous to assemble the actuator array using integrated actuator components, such as a single patterned plate of a resilient, non-magnetic material forming the membranes of the actuators and a respective single patterned block of soft-ferromagnetic material to form the base yoke sections, the intermediate yoke sections and the top yoke sections.

In other examples the mirror may be substantially larger, e.g. having a diameter in the range of 50 cm and higher. In such cases wherein the actuators typically have larger lateral dimensions, it may be more advantageous to assemble the actuators of the actuator array individually to the mirror, for example using an additional support frame.

In some embodiments, mirror segments of a segmented mirror are mutually mechanically decoupled, so that their state can be controlled independently by the their proper actuator. The proper actuator may for example be configured to position the mirror segment by translating the mirror segment in the axial direction defined by the actuator. Alternatively, the mirror segment may be partially restricted. For example the mirror segment may be rotatable according to an axis in a plane of the mirror and the actuator may control the rotation angle. Still further each mirror segment may be controlled by a plurality of actuators, so that position and orientation of each mirror segment is fully controllable.

In another example the mirror segment is a plate of a flexible material that is fixed at its edges and the actuator is provided to deform the mirror segment. In other embodiments, the mirror segments are mutually integral portions of a single plate of flexible material and the shape of the segmented mirror is determined by the force exerted on each of its mirror segments by their respective actuator and further dependent on the extent to which mirror segments are mechanically coupled as a result of the stiffness of the plate. By providing a thinned boundary zone between mutually neighboring mirror segments, their mechanical coupling can be reduced.

The present disclosure further provides a method for assembling an improved actuator as claimed in claim 15.

BRIEF DESCRIPTION OF THE DRAWINGS

These and other aspects of the present disclosure are described in more detail with reference to the drawings. Therein:

FIG. 5 is a cross-section and FIG. 5A is a section according to VA-VA in FIG. 5;

DETAILED DESCRIPTION OF EMBODIMENTS

FIG. 1A, FIG. 1B schematically show a top-view of a electromagnetically controlled segmented mirror 30. Therein FIG. 1B shows a cross-section according to BB in FIG. 1A. The mirror 30 comprises a plurality of mirror segments 31*a*, 31*b*, . . . , 31*n*. Each mirror segment is controlled by a proper electromagnetic actuator 1*a*, 1*b*, . . . 1*n*, to which it is mechanically coupled to by an associated actuation rod. For example mirror segment 31*a* is mechanically coupled by an actuation rod 22*a* to an electromagnetic actuator 1*a*. For illustration purposes, the mirror of FIG. 1A has 16 mirror segments. In practice, the number of segments may be significantly higher e.g. in the order of a few hundred or a few thousands. As further shown in FIG. 1B, the actuators 1*a*, 1*b*, . . . receive a respective control signal from an actuator controller 40.

Figure 1:
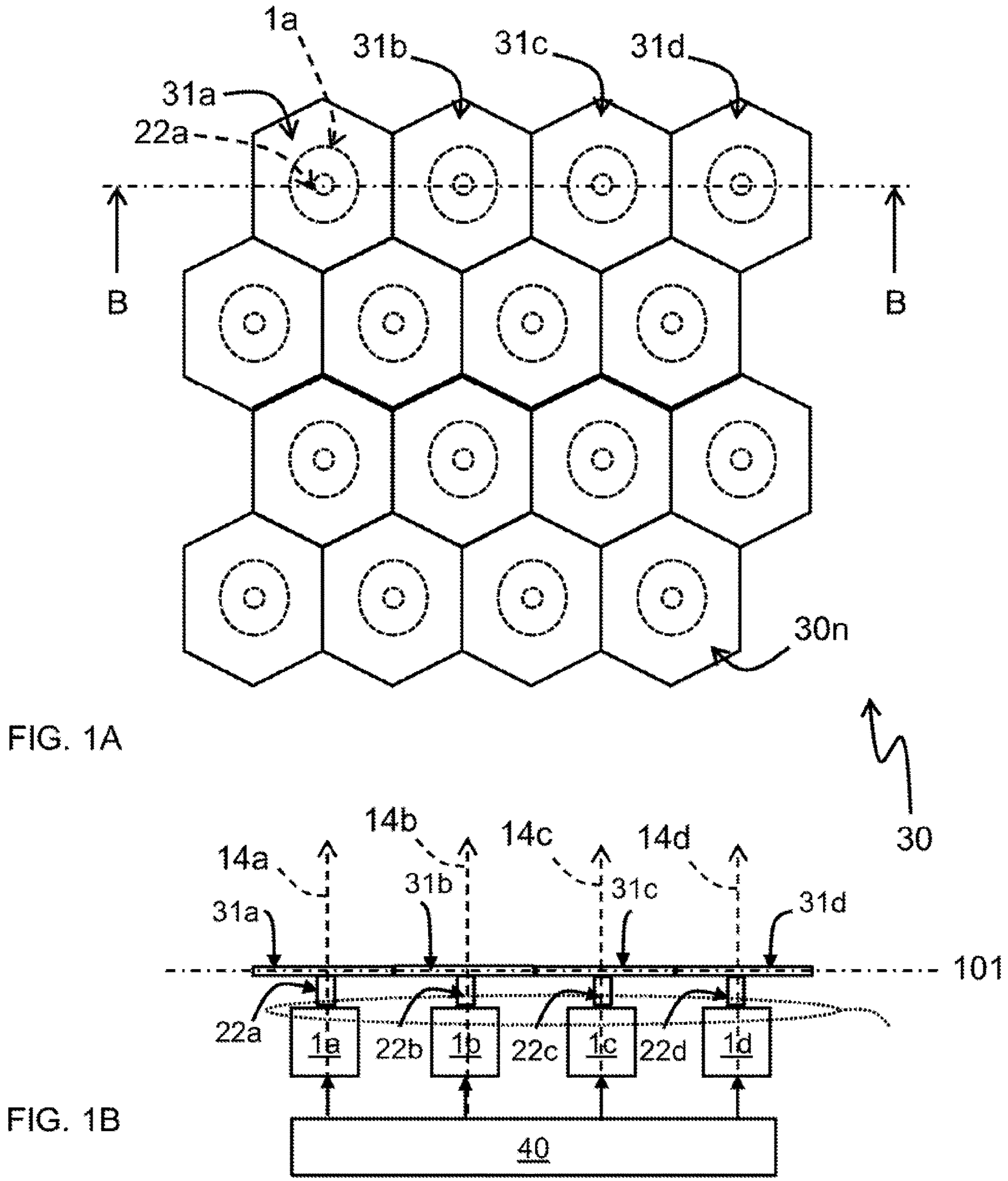
FIG. 1A, FIG. 1B schematically show a top-view of an embodiment of the improved electromagnetically controlled segmented mirror.
Figure 2:
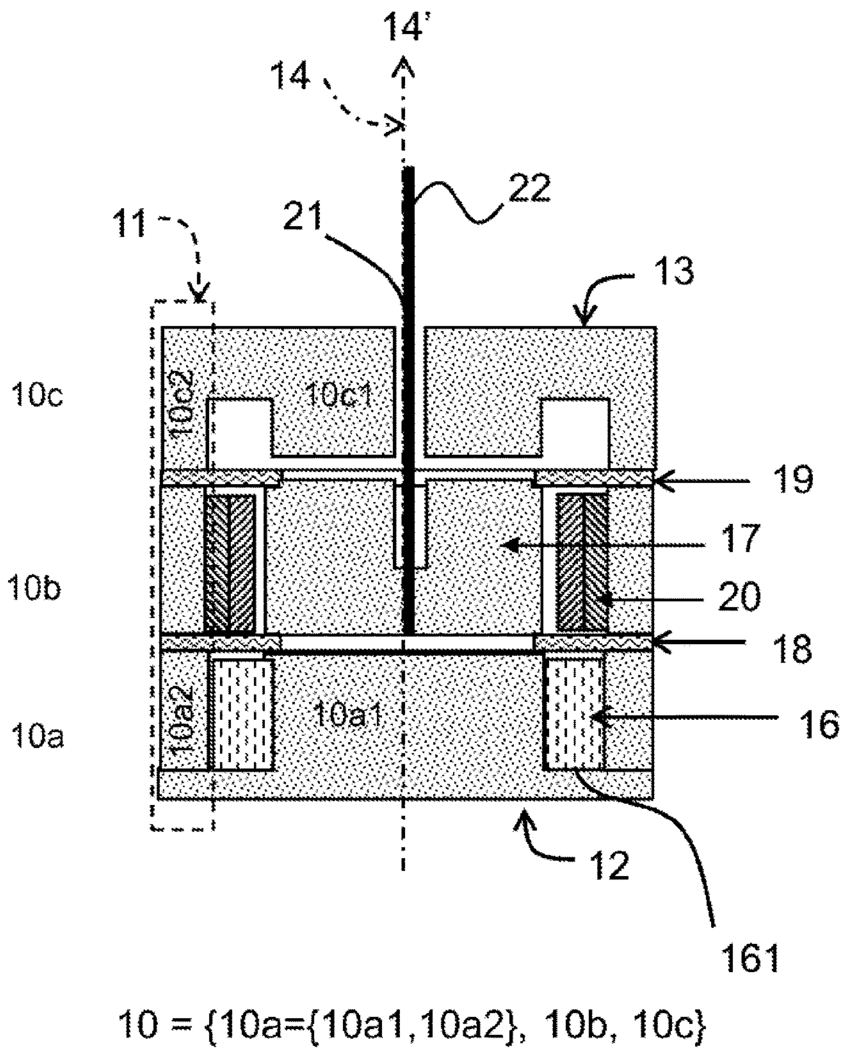
FIG. 2 shows an axial section of an embodiment of an improved electromagnetic actuator suitable for use therein.
Figure 3:
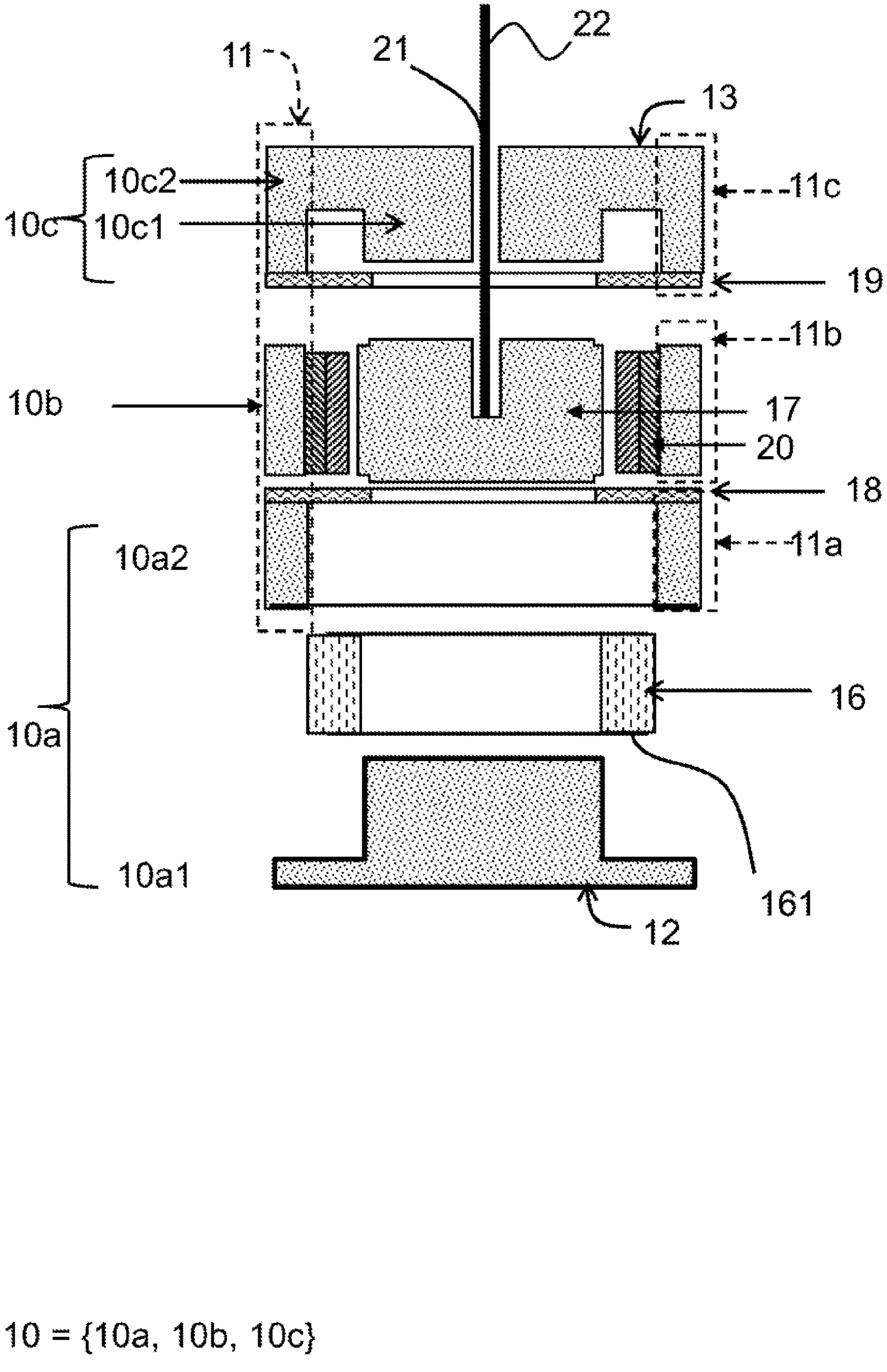
FIG. 3 shows an exploded view of said embodiment according to the same axial section.

FIG. 2 and FIG. 3 schematically show an embodiment of an electromagnetic actuator 1 as used in the mirror 30 of FIG. 1. Therein FIG. 2 shows a cross-section of the electromagnetic actuator 1 in its assembled state and FIG. 3 shows an exploded view of the actuator 1 according to the same cross-section. The actuator 1 comprises a yoke 10 of a soft-ferromagnetic material with an at least substantially cylindrical circumferential wall 11 that is covered at a first end with a base 12 and at a second end with a top 13. Examples of soft-ferromagnetic materials are iron, nickel, and alloys of iron and nickel and/or cobalt. The circumferential wall 11 defines an axis 14 in a direction 14 from the base 12 to the top 13. In that direction 14', the yoke 10 subsequently has a base yoke section 10*a*, an intermediate yoke section 10*b* and a top yoke section 10*c*. The yoke sections 10*a*, 10*b* and 10*c* have a respective section 11*a*, 11*b*, 11*c* of the cylindrical wall 11. In the embodiment shown, the base yoke section 10*a*, the intermediate yoke section 10*b* and the top yoke section 10*c* are mutually distinct components that are assembled to form the yoke 10. In turn, the base yoke section 10*a* is assembled from a first subcomponent 10*a*1 forming the base 12 with the protrusion and a second, cylindrical subcomponent 10*a*2. In other examples the two or more components or subcomponents are replaced with an integral component. For example, the base yoke section may be provided as an integral component. As a further example, the intermediate yoke section 10*b* and the top yoke section 10*c* may be provided as an integral component.

As shown in FIG. 2 and in the exploded view in FIG. 3, the base yoke section 10*a* houses an electromagnetic coil 16 having power supply lines 161 in the space between its protrusion 10*a*1 and its axial section 10*a*2 of the circumferential wall. Alternatively, or additionally, an electromagnetic coil may be housed in the space between the protrusion 10*c*1 and the cylindrical section 10*c*2 (11*c*) of the circumferential wall of the top yoke section. The electromagnetic coil 16 has power supply lines 161 with which the electromagnetic actuator 1 can be driven by a controller 40.

The intermediate yoke section 10*b* holds a cylindrical permanent magnet 20 that is fixed within an inner surface of the cylindrical wall 11*b* in the intermediate yoke section. The cylindrical permanent magnet 20 has a first magnetic pole directed radially outward, therewith facing the inner wall and a second magnetic pole faces an axially movable core element 17 housed in an inner space enclosed by the permanent magnet 20. Instead of a single, cylindrical permanent magnet 20, a plurality of separate permanent magnets may be used that are distributed over the inner wall of the inner surface of the cylindrical wall 11*b*. In some embodiments the permanent magnet comprises a material selected from a group comprising NdFeB, SmCo or AlNiCo.

As shown in FIG. 2, the core element 17 is clamped between a pair of membranes 18, 19. The membranes act as resilient elements that compensate a an attractive force having negative stiffness characteristics exerted by the permanent magnet 20 on the core element 17. The membranes are of a resilient, non-magnetic material such as stainless steel, aluminum, titanium or alloys thereof, for example with vanadium, for example the alloy Ti-6Al-V (TiAlV) and/or molybdenum, but also plastics may be contemplated for this purpose.

The actuation rod 22, which is fixed to the core element 17, extends with space in an axial direction through an opening 21 in the top 13 of the actuator 1. In some other embodiments an opening for the actuation rod is provided in the base of the actuator.

Figure 4:
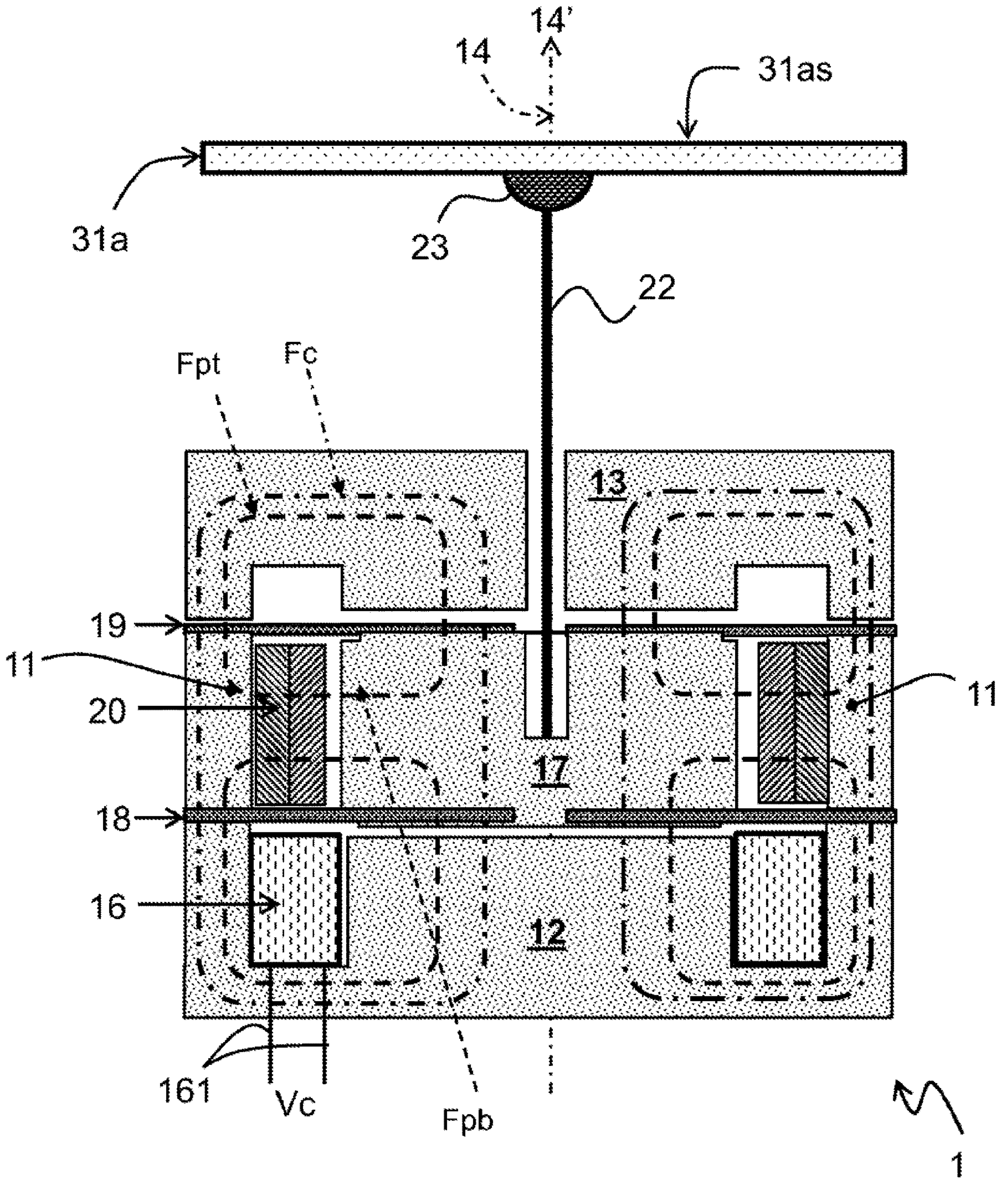
FIG. 4 schematically shows an axial section of an embodiment of an improved electromagnetic actuator in its operational state.

FIG. 4 shows in the same cross-section the actuator in an operational state, for example to control a segment 31*a*, with reflective surface portion 31*as* of the mirror 30 of FIG. 1A, 1B. Therein a control voltage Vc is supplied to the electromagnetic coil 16, for example by a controller 40 as shown in FIG. 1B. Therewith a magnetic flux is induced along a path Fc that extends from the base 12, through the cylindrical wall 11, through the top 13 and through the axially movable core element 17. As further shown in FIG. 4, the permanent magnet 20 provides for a magnetic flux along a first path FPt extending through the top 13 and along a second path FPb extending through the base 12. The polarity of the magnetic flux density (Dp) originating from the permanent magnet 20 in the upper portion of the core element 17 (facing the top 13) is opposite to the polarity of the magnetic flux density (−Dp) originating from the permanent magnet 20 in the lower portion of the core element 17 (facing the base 12). The magnetic flux (Dc) of the electromagnetic coil 16 has a flux density Dc with the same polarity in both core element portions. The magnetic force Fm exerted on the core element is proportional to the integral of the squared total flux density. As a result, in a first axial portion of the core element 17, for example the upper half a magnetic force is induced of the order $(Dc+Dp)^2$ and in the second axial portion of the core element, in that case the lower half, a magnetic force of the order $(Dc-Dp)^2$ is induced. The sum of these terms is linear in Dc. Therewith the operation of the electromagnetic actuator 1, for example to actuate a mirror segment 31*a* is well controllable.

Figure 5:
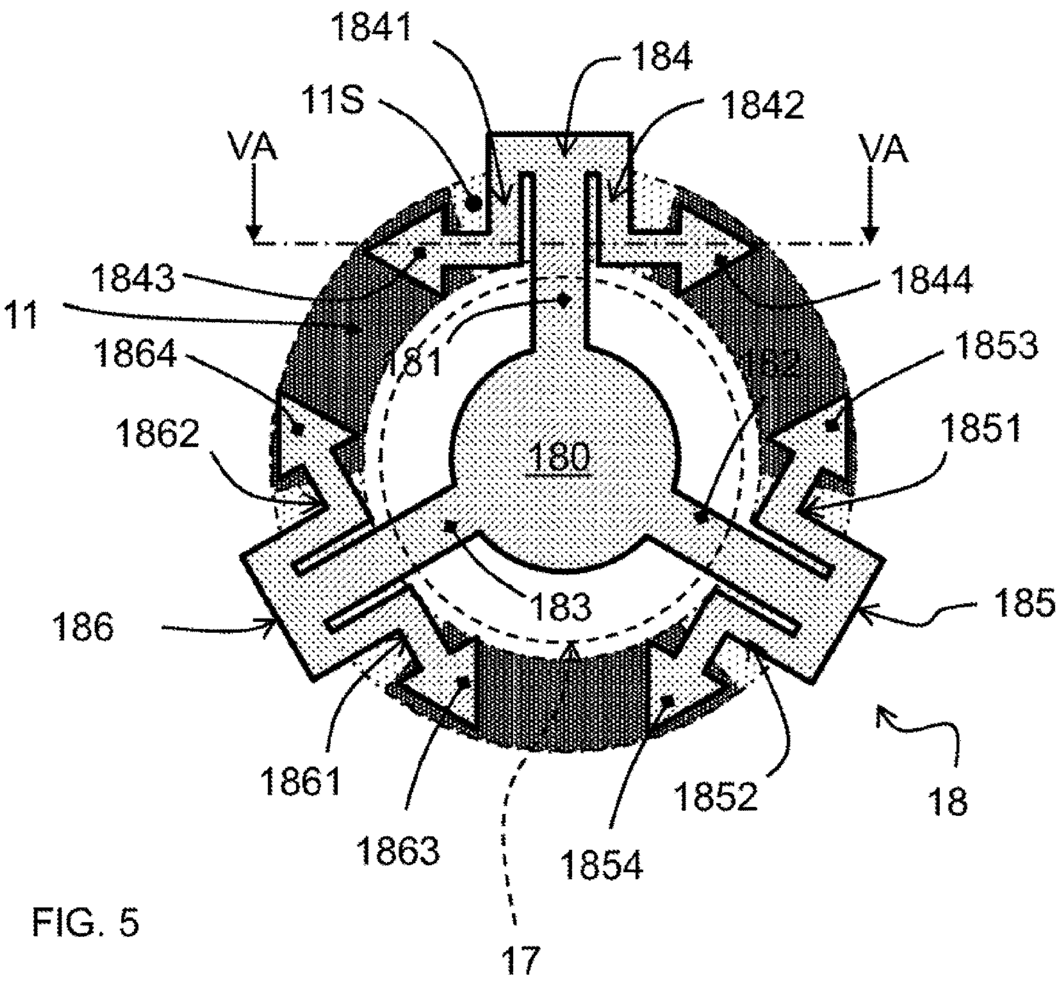
FIG. 5, 5A show in more detail aspects of an embodiment of the improved electromagnetically controlled segmented mirror; Therein
Figure 5A:
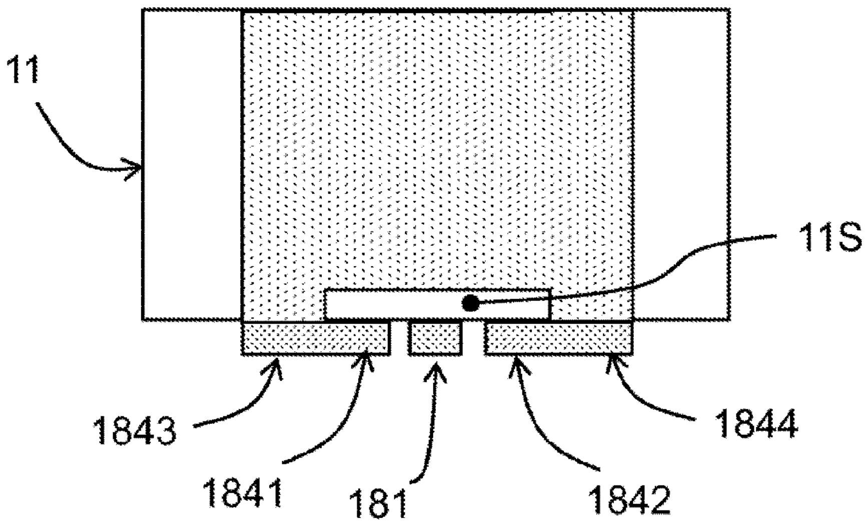

FIG. 5 schematically shows an exemplary membrane 18. The exemplary membrane 18 is provided with a central portion 180 that is to be fixed to the axially movable core element 17 (schematically indicated by the dashed contour) and with a first, a second and a third suspension arm 181, 182, 183 that radially extend outwards to an end 184, 185, 186 where it is mechanically coupled between a pair of yoke sections. As further shown in FIG. 5, the ends 184, 185, 186 bifurcate each into a first and a second end portions 1841, 1842; 1851, 1852; 1861, 1862 that at least partly extend radially inward. The end portions 1841, 1842; 1851, 1852; 1861, 1862 further extend in mutually opposite tangential directions where they are fixed to a proper mounting element 1843, 1844; 1853, 1854; 1863, 1864 that is fixed to the wall 11 of the yoke, for example being clamped and/or adhered by an adhesive. FIG. 5A shows a cross-section according to VA-VA in FIG. 5. As shown in more detail therein, the cylindrical wall 11 defines a space 11S for the radially extending suspension arms, e.g. 181 and their corresponding ends, e.g. 184 with end portions 1841, 1842, so that their movements are only restricted due to their attachment to the mounting elements, e.g. 1843, 1844.

In the example of FIG. 1A, 1B, the actuators 1*a*, 1*b*, . . . , 1*n*, form an actuator array 100 of spatially distributed actuators. In the example shown the actuators of said plurality of actuators are arranged with their axis 14*a*, 14*b*, 14*c* in a mutually parallel direction for example corresponding to the surface normal of a virtual plane 101. The virtual plane 101 in this case indicates a neutral state of the mirror 30. In some embodiments, the mirror 30 has a curved shape in its neutral state and the axis of each actuator is parallel to the surface normal of the mirror segment that it controls.

In the embodiments of the electromagnetically controlled segmented mirror 30 shown in FIG. 1A, 1B, the actuators 1*a*, 1*b*, . . . , 1*n* are mutually separate units. The actuators 1*a*, 1*b*, . . . , 1*n* in that case are for example locally assembled with the mirror 30, for example using an additional carrier frame.

Figure 6:
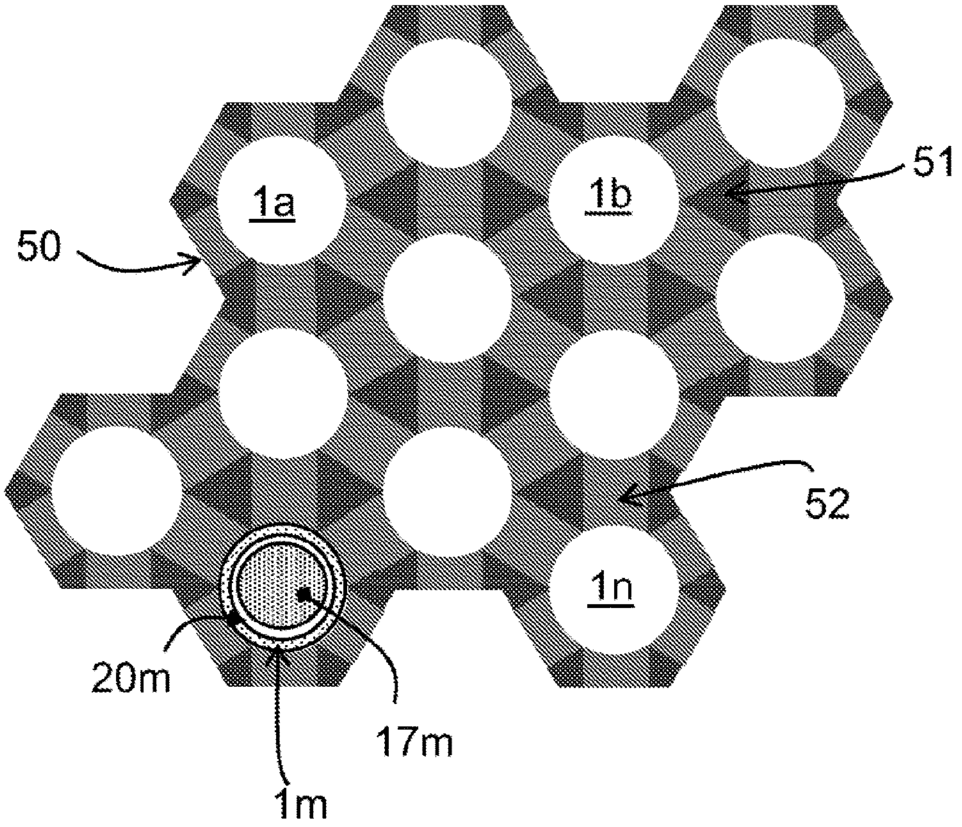
FIG. 6 shows a first part of an embodiment of an improved actuator assembly.

In alternative embodiments, the actuators comprise at least one part that is integrally formed. In the example of FIG. 6, the intermediate yoke sections indicated as 10*b* in FIGS. 2 and 3 are formed as a single block 50 of a soft ferromagnetic material. The block 50 is patterned by forming an inner space therein for each of the actuators 1*a*, 1*b*, . . . , 1*n*. The individual actuators, e.g. 1*m* are provided with a proper permanent magnet fixed 20*m* that is fixed to the inner wall of its inner space and a respective movable core element 17*m*. In the embodiment shown in FIG. 6, the dark grey portions 51 indicate locations for attaching mounting elements, e.g. 1843, 1844; 1853, 1854; 1863, 1864 (see FIG. 5, 5A). The light gray portions 52 indicates areas where a space 11S (see FIG. 5, 5A) is formed to allow movements of the ends 184, 185, 186 of the suspension arms 181, 182, 183 and their end portions 1841, 1842, etc. coupling them to these connection elements. Also the other sections of the yoke, i.e. the base section and the top section can be provided as a single patterned block of a soft ferromagnetic material.

Figure 7:
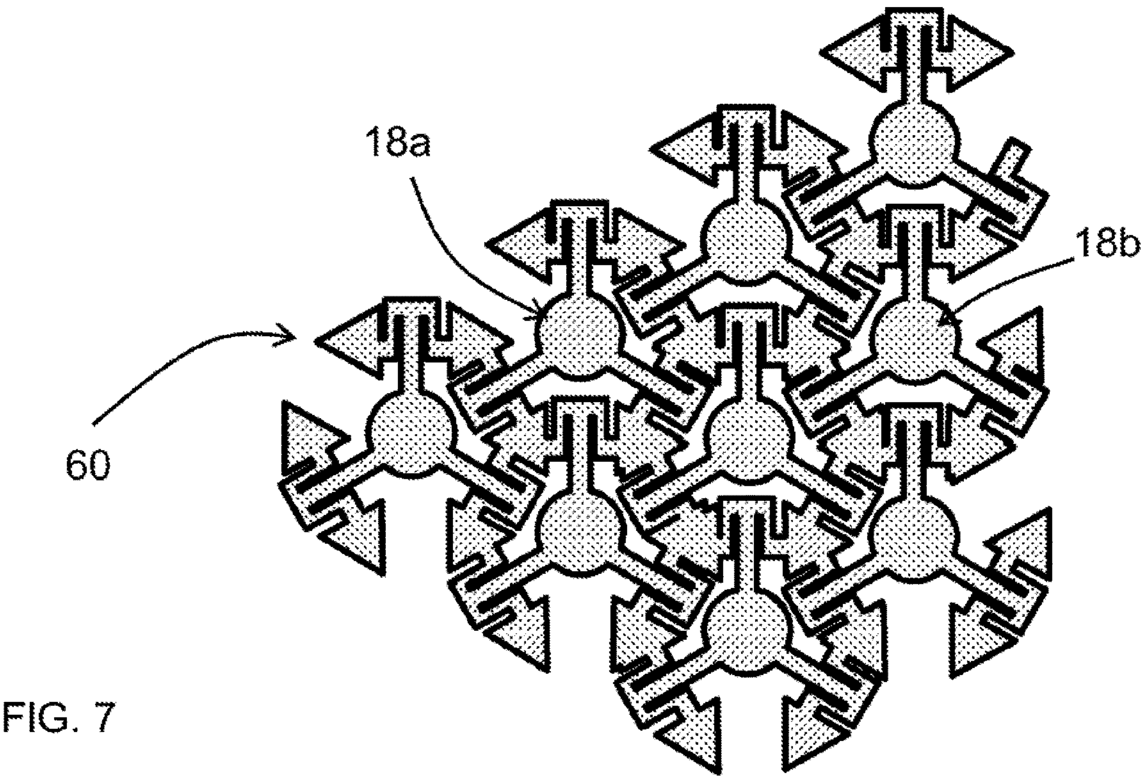
FIG. 7 shows a second part of an embodiment of an improved actuator assembly.

As shown in FIG. 7, also the membranes 18*a*, 18*b*, . . . of actuators 1*a*, 1*b* are integrally formed, in this cases as a single patterned plate 60 of a resilient, non-magnetic material. Therewith amounting element of a membrane 18*a* of an actuator is shared with membranes of other actuators.

Figure 8:
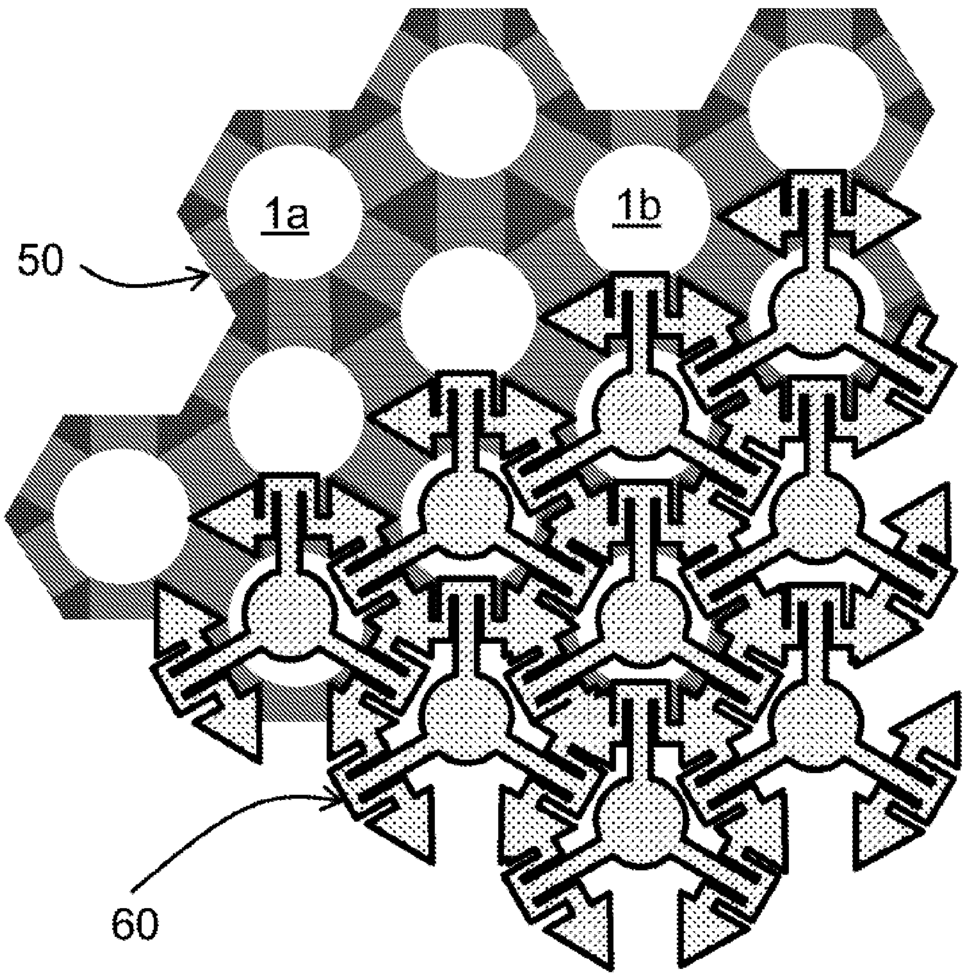
FIG. 8 shows an assembly of these parts.

FIG. 8 shows how these components 50, 60 are stacked when constructing an actuator assembly. For illustration purposes only a portion of the patterned plate 60 is shown, to reveal the clock 50 of soft-ferromagnetic material below.

As noted above, also the other sections of the yoke, i.e. the base section and the top section can be provided as a single patterned component. Therewith the assembly process of an actuator assembly can be strongly simplified.

In an embodiment, a single actuator as shown for example in FIGS. 2 and 3 is manufactured as follows. In first steps a base yoke section 10*a*, an intermediate yoke section 10*b* and a top yoke section 10*c* are provided, each of a soft-ferromagnetic material. Also a first and a second membrane 18, 19 of an at least substantially non-magnetic material is provided. Furthermore, a core element 17, a permanent magnet 20 an electromagnetic coil 16 are provided. The electromagnetic coil 16 is mounted in the base yoke section 10*a* or in the top yoke section 10*c*. The base yoke section 10*a* with the first membrane 18 is mounted against the intermediate yoke section 10*b*. Hence the first membrane 18 is accommodated between the base yoke section and the intermediate yoke section 10*b*. In a preceding step, the first membrane 18 may first be adhered to one of the base yoke section and the intermediate yoke section.

The permanent magnet 20 is mounted against an inner wall of the intermediate yoke section 10*b*, so that a first magnetic pole thereof faces the inner wall and a second magnetic pole facing inwards. The core element 17 is inserted in a remaining inner space of the intermediate yoke section 10*b*. The upper yoke section 10*c* with the second membrane 19 against the intermediate yoke section 10*b*. Hence the second membrane 19 is accommodated between the top yoke section and the intermediate yoke section. In a preceding step, the second membrane 19 may first be adhered to one of the top yoke section and the intermediate yoke section. In this example the actuator is assembled in a direction from the base to the top. Alternatively the actuator may be assembled in a direction from the top to the base.

As noted, parts of actuators in an actuator array may be provided integrally, for example as shown in FIGS. 6, 7 and 8. In that case manufacturing of an actuator array may take place as follows. A respective electromagnetic coil 16 for each actuator in the actuator array is mounted in the block of soft-ferromagnetic material forming the base yoke sections (base block) or in the block of soft-ferromagnetic material forming the top yoke sections (top block). The patterned plate of a resilient material forming the first membranes (first patterned plate) is attached to the base block or to the block of soft-ferromagnetic material forming the intermediate yoke sections (intermediate block). Then the base block, the first patterned plate and the intermediate block are assembled. A respective permanent magnet is mounted in a proper opening for each actuator in the intermediate block. Furthermore a proper core element for each actuator is inserted in the remaining inner space. Then the subassembly so obtained is further assembled with a second patterned plate forming the second membranes and the top block. Alternatively, the assembly may take place in a top down order.

Figure 9A:
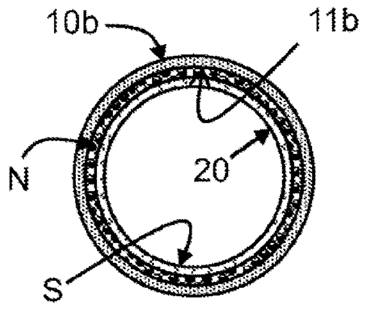
FIGS. 9A, 9B and 9C shows various configurations of permanent magnets in an intermediate yoke section.

In some embodiments, as shown schematically in FIG. 9A, the at least one permanent magnet fixed 20 that is accommodated in the intermediate yoke section 10*b* is a single cylindrical magnet with its first magnetic pole (e.g. a northpole N) facing radially outward towards the inner surface of the cylindrical wall 11*b* of the intermediate yoke section 10*b*.

Figure 9B:
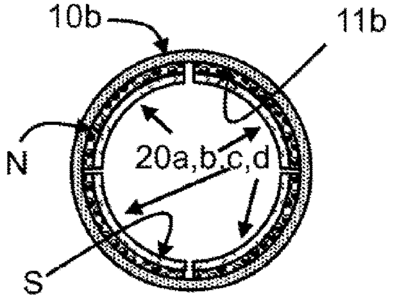
Figure 9C:
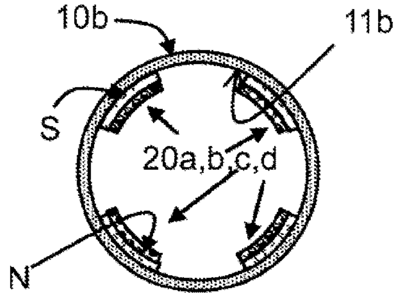

In other embodiments, shown schematically in FIG. 9B, a cylindrical magnet with its first magnetic pole N facing radially outward is formed by a set of magnet components 20*a, b, c, d* that each are arranged with their first magnetic pole N facing outward. By way of example it is shown in FIG. 9C that magnet component(s) do not need to form an uninterrupted ring inside the intermediate yoke section. It will be appreciated that the first magnetic pole of a magnet 20 or magnet component 20*a*, . . . , 20*d* is not necessarily the northpole N. However, a plurality of magnet components in an intermediate yoke section 10*b* should mutually have the same pole facing outwards, e.g. their northpole N as shown in FIG. 9B or the southpole S as shown in FIG. 9C.

Figure 9D:
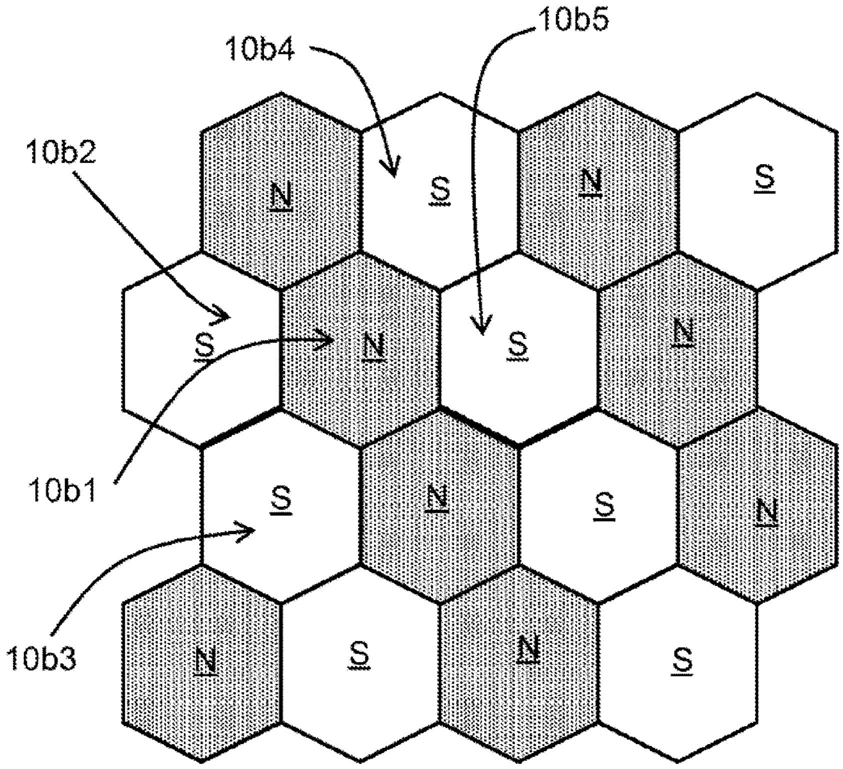
FIG. 9D shows an example of magnetic polarity variations in an improved actuator assembly.

In some embodiments of the actuator array, each intermediate yoke section bounds to at least one other intermediate yoke section having a permanent magnet with opposite polarity. In some examples for each intermediate yoke section at least two out of three neighboring intermediate yoke section have a permanent magnet with opposite polarity. This is illustrated in FIG. 9D, wherein the character "N" indicates that the northpole of the at least one magnetic element faces outward in the intermediate yoke section, and the character "S" indicates that the southpole of the at least one magnetic element faces outward in the intermediate yoke section. In the example of FIG. 9D, the intermediate yoke section 10*b*1 bounds to four intermediate yoke sections 10*b*2, 10*b*3, 10*b*4, 10*b*5 having a permanent magnet with opposite polarity.

In this embodiment wherein intermediate yoke section bound to one or more other intermediate yoke section having a permanent magnet with opposite polarity it is achieved that the net magnetic flux in the yokes is substantially cancelled. Therewith a saturation of the yoke can be more easily avoided and in some cases the wall of the yokes can be thinner than otherwise would be the case.

The invention claimed is:

1. An electromagnetic actuator comprising a soft-ferromagnetic yoke, with an at least substantially cylindrical circumferential wall covered at a first end with a base and at a second end with a top, wherein the circumferential wall defines an axis in an axial direction from the base end to the top, wherein the soft-ferromagnetic yoke comprises, in the axial direction, a base yoke section, an intermediate yoke section and a top yoke section, wherein the base yoke section forms the base and a first axial section of the circumferential wall, as well as a base protrusion surrounded with space by the first axial section of the circumferential wall, wherein the intermediate yoke section forms a second axial section of the circumferential wall, and wherein the top yoke section forms the top and a third axial section of the circumferential wall, as well as a top protrusion surrounded with space by the third axial section of the circumferential wall, wherein the base yoke section and/or the top yoke section house an electromagnetic coil in the space between their protrusion and their axial section of the circumferential wall, wherein the intermediate yoke section holds at least one permanent magnet fixed with a first magnetic pole facing an inner surface of the cylindrical wall, and with a second magnetic pole facing an inner space in the intermediate yoke section, wherein the permanent magnet exerts an attractive force having negative stiffness on an axially movable core element housed in the inner space, wherein at least one of the base and the top define an axially extending opening through which protrudes an actuation rod fixed to the axially movable core element, wherein the actuator further comprises:

a first membrane and a second membrane of an at least substantially non-magnetic material, wherein the first membrane is arranged between the base yoke section and the intermediate yoke section and wherein the second membrane is arranged between the intermediate yoke section and the top yoke section, wherein the axially movable core element is flexibly restrained between the first and the second membrane, and wherein the first membrane and the second membrane, together, form a resilient element having a stiffness with a value that is equal to or greater than a magnitude of the negative stiffness.

2. The actuator according to claim 1, wherein the first membrane comprises:

a central portion fixed to the axially movable core element;

a first suspension arm;

a second suspension arm; and a third suspension arm wherein each suspension arm radially extend outwards to a respective end where it is mechanically coupled between a pair of yoke sections.

3. The actuator according to claim 2, wherein the respective end bifurcates into a first end portion and a second end portion that at least partly extend radially inward.

4. The actuator according to claim 3, wherein the first end portion and the second end portion of each suspension arm further extend in mutually opposite tangential directions to a respective connection element to which they are fixed.

5. An actuator array comprising a plurality of spatially distributed actuators according to claim 1.

6. The actuator array according to claim 5, wherein the spatially distributed actuators comprise at least one part that is integrally formed.

7. The actuator array according to claim 6, wherein the at least one integrally formed part is a section of the yoke, wherein for each of the electromagnetic actuators the section of the yoke is formed in a single patterned block of ferromagnetic material, and/or wherein the at least one integrally formed part is a membrane, wherein the membranes of the actuators are formed as a single patterned plate of a resilient, non-magnetic material.

8. The actuator array according to claim 5, wherein each intermediate yoke section bounds to at least one other intermediate yoke section that has a permanent magnet with a polarity opposite to that of the each intermediate yoke section.

9. A mirror comprising:

an actuator array with a plurality of spatially distributed electromagnetic actuators, a plurality of mirror segments which are movable relative to each other, respective mirror segments being mechanically coupled to an actuation rod of a respective electromagnetic actuator of the actuator array, wherein the electromagnetic actuators each comprise a soft-ferromagnetic yoke, with an at least substantially cylindrical circumferential wall covered at a first end with a base and at a second end with a top, wherein the circumferential wall defines an axis in an axial direction from the base end to the top, wherein the soft-ferromagnetic yoke comprises, in the axial direction, a base yoke section, an intermediate yoke section and a top yoke section, wherein the base yoke section forms the base and a first axial section of the circumferential wall, as well as a base protrusion surrounded with space by the first axial section of the circumferential wall, wherein the intermediate yoke section forms a second axial section of the circumferential wall, and wherein the top yoke section forms the top and a third axial section of the circumferential wall, as well as a top protrusion surrounded with space by the third axial section of the circumferential wall, wherein the base yoke section and/or the top yoke section house an electromagnetic coil in the space between their protrusion and their axial section of the circumferential wall, wherein the intermediate yoke section holds at least one permanent magnet fixed with a first magnetic pole facing an inner surface of the cylindrical wall, and with a second magnetic pole facing an inner space in the intermediate yoke section, wherein the permanent magnet exerts an attractive force having negative stiffness on an axially movable core element housed in the inner space, wherein at least one of the base and the top define an axially extending opening through which protrudes an actuation rod fixed to the axially movable core element, wherein the actuator further comprises:

a first membrane and a second membrane of an at least substantially non-magnetic material, wherein the first membrane is arranged between the base yoke section and the intermediate yoke section and wherein the second membrane is arranged between the intermediate yoke section and the top yoke section, wherein the axially movable core element is flexibly restrained between the first and the second membrane, and wherein the first membrane and the second membrane, together, form a resilient element having a stiffness with a value that is equal to or greater than a magnitude of the negative stiffness.

10. The mirror according to claim 9, wherein the spatially distributed actuators comprise at least one part that is integrally formed.

11. The mirror according to claim 10, wherein the at least one integrally formed part is a section of the yoke, wherein for each of the electromagnetic actuators the section of the yoke is formed in a single patterned block of ferromagnetic material, and/or wherein the at least one integrally formed part is a membrane, the membranes of the actuators being formed as a single patterned plate of a resilient, non-magnetic material.

12. The mirror according to claim 11, wherein each intermediate yoke section bounds to at least one other intermediate yoke section that has a permanent magnet with a polarity opposite to that of the each intermediate yoke section.

13. The mirror according to claim 11, wherein, the first membrane of each actuator comprises:

a central portion fixed to the axially movable core element;

a first suspension arm;

a second suspension arm; and a third suspension arm wherein each suspension arm radially extend outwards to a respective end where it is mechanically coupled between a pair of yoke sections.

14. The mirror according to claim 10, wherein each intermediate yoke section bounds to at least one other intermediate yoke section that has a permanent magnet with a polarity opposite to that of the each intermediate yoke section.

15. The mirror according to claim 10, wherein, the first membrane of each actuator comprises:

a central portion fixed to the axially movable core element;

a first suspension arm;

a second suspension arm; and a third suspension arm wherein each suspension arm radially extend outwards to a respective end where it is mechanically coupled between a pair of yoke sections.

16. The mirror according to claim 9, wherein each intermediate yoke section bounds to at least one other intermediate yoke section that has a permanent magnet with a polarity opposite to that of the each intermediate yoke section.

17. The mirror according to claim 9, wherein, the first membrane of each actuator comprises:

a central portion fixed to the axially movable core element;

a first suspension arm;

a second suspension arm; and a third suspension arm wherein each suspension arm radially extend outwards to a respective end where it is mechanically coupled between a pair of yoke sections.

18. The mirror according to claim 17, wherein the respective end bifurcates into a first end portion and a second end portion that at least partly extend radially inward.

19. The mirror according to claim 18, wherein the first end portion and the second end portion of each suspension arm further extend in mutually opposite tangential directions to a respective connection element to which they are fixed.

* * * * *